United States Patent [19]
Nollet

[11] Patent Number: 4,672,585
[45] Date of Patent: Jun. 9, 1987

[54] DEVICE FOR STOPPING THE RUNNING OF PROGRAMS BEING EXECUTED IN A MICROPROCESSOR PRIOR TO THE DISAPPEARANCE OF THE POWER SUPPLY VOLTAGE OF THE MICROPROCESSOR

[75] Inventor: Michel Nollet, Noisy Le Roi, France

[73] Assignee: Thomson-Lgt Laboratoire General des Telecommuications, Chatou, France

[21] Appl. No.: 743,611

[22] Filed: Jun. 11, 1985

[30] Foreign Application Priority Data

Jun. 14, 1984 [FR] France ................ 84 09309

[51] Int. Cl.⁴ .................................. G11C 11/40
[52] U.S. Cl. .............................. 365/228; 365/226
[58] Field of Search ............ 365/226, 227, 228, 229

[56] References Cited

U.S. PATENT DOCUMENTS

| | | | |
|---|---|---|---|
| 3,562,555 | 2/1971 | Ahrons | 307/200 A |
| 4,234,920 | 11/1980 | Van Ness et al. | 364/200 |
| 4,534,018 | 8/1985 | Eckert et al. | 365/228 |

FOREIGN PATENT DOCUMENTS

2531510 2/1977 Fed. Rep. of Germany ...... 365/228
2454137 11/1980 France .

OTHER PUBLICATIONS

Electronics, vol. 50, No. 15, 21 Jul. 1977, p. 104; I. P. Breikss: "Nonmaskable interrupt saves processor register contents".

Primary Examiner—Joseph A. Popek
Attorney, Agent, or Firm—Oblon, Fisher, Spivak, McClelland & Maier

[57] ABSTRACT

A device for stopping the running of programs being executed in a microprocessor prior to the disappearance of the power supply voltage of the microprocessor comprising a differentiator circuit shunted across the power supply line VA of a microprocessor for inhibiting the access circuit to the internal RAM in the microprocessor and for reinitializing the internal circuits of the microprocessor as soon as the power supply voltage level VA begins to decrease from a predetermined decrease threshold.

5 Claims, 3 Drawing Figures

DEVICE FOR STOPPING THE RUNNING OF PROGRAMS BEING EXECUTED IN A MICROPROCESSOR PRIOR TO THE DISAPPEARANCE OF THE POWER SUPPLY VOLTAGE OF THE MICROPROCESSOR

The present invention relates to a device for stopping the running programs being executed in a microprocessor prior to the disappearance of the supply voltage of the microprocessor.

BACKGROUND OF THE INVENTION

It is known to apply a control voltage to the input, generally designated by $\overline{\text{RESET}}$, of a microprocessor for reinitializing this latter at the time of mains power supply cuts. It is also known, in the case where the execution of a safeguard subprogram is required, to apply this control voltage at a time delayed with respect to a time of detection of the disappearance of the mains by a sufficiently long period to allow a program to be executed for safeguarding the instruction which is being executed.

This arrangement however has the disadvantage that it does not give any guarantee as to the operation of the microprocessor when the output voltage of the power supply disappears for a cause other than that of the disappearance of the mains voltage, such an event possibly occurring in the case, more especially, of a short circuit across the power supply output or else in the case of accidental disconnection of the card holder of the microprocessor from its power supply. In these cases, in fact, the voltage for reinitializing the microprocessor cannot be applied to the $\overline{\text{RESET}}$ input because the mains voltage is still present and the supply voltage of the microprocessor disappears. This causes uncertain operation of the microprocessor which may generate, on its input-output channel, erratic data which may adversely affect the operation of reception devices coupled to the microprocessor over this channel.

In the case where the execution of a safeguard sub program is not required, the known arrangement has the additional disadvantage of pointlessly complicating the power supply of the microprocessor, for it does not seem indispensable in this case to have a logic signal prior to the beginning of the decrease of the power supply voltage of the microprocessor when it would be sufficient simply to apply to the $\overline{\text{RESET}}$ input a logic voltage equal to 0 volt as soon as the power supply voltage of the microprocessor disappears.

SUMMARY OF THE INVENTION

The purpose of the invention is to overcome the above mentioned drawbacks.

For this, the invention provides a device for stopping the running of programs being executed in a microprocessor having an initialization $\overline{\text{RESET}}$ input and a power supply ground prior to the disappearance of the power supply voltage of the microprocessor, comprising:

(a) a differentiator circuit shunted between a power supply and a line VA of the microprocessor and the power supply ground.

(b) a current amplifier coupled to the initialization $\overline{\text{RESET}}$ input of the microcprocessor and the differentiator circuit, (c) and a capacitor connected between the $\overline{\text{RESET}}$ input and the power supply ground of the microprocessor.

The device of the invention has the advantage that it allows a logic voltage equal to 0 to be applied to the $\overline{\text{RESET}}$ terminal of the microprocessor as soon as the supply voltage begins to decrease. It also has the advantage of allowing the microprocessor to be closely associated with its protection system, which may be achieved simply by placing the microprocessor and the protection system close to each other on the same support card. The support card of the microprocessor and its protection system may therefore, in this last configuration, be connected and disconnected at will to any source capable of providing the power supply voltage of the microprocessor even if this source has no system or device for monitoring the level of the power supply voltage.

Other features and advantages of the invention will appear also from the following description with reference to the accompanying drawings given solely by way of example, which represent:

DESCRIPTION OF THE PREFERRED EMBODIMENT

Figure 1:
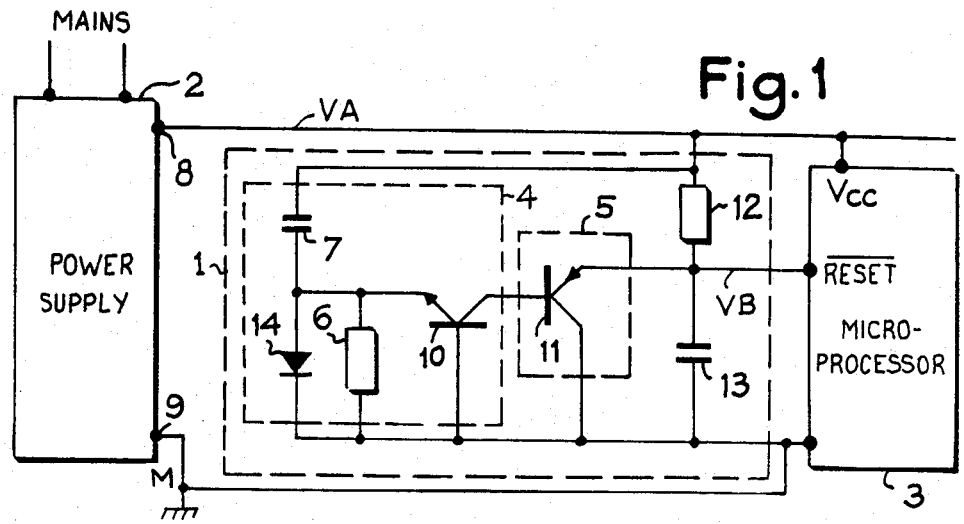
FIG. 1 shows one embodiment of the device of the invention.

The device of the invention is shown at 1 in FIG. 1 inside a broken line rectangle, connected to the DC voltage supply line of a microprocessor 3, of the type known for example under the designation 8048/8049 commercialized by the firm SIGNETICS. Device 1 comprises a differentiator circuit 4 and a current amplifier 5 also shown inside broken lines. The differentiator circuit 1 is formed by a resistor 6 and a capacitor 7 connected in series between DC voltage and current output terminals 8 and 9 of the supply 2 and a transistor 10. The current amplifier 5 comprises a transistor 11. Transistor 10 is of the NPN type and is connected by its base both to the terminal 9 of the power supply 2 and to one end of a resistor 6 which is not common with the end of capacitor 7 through a ground line M of the device. The PNP type transistor 11 is connected by its base to the collector of transistor 10 and by its collector to the ground line M of the device. The emitter of transistor 11 is connected both to the $\overline{\text{RESET}}$ input of the microprocessor 3 and to the terminal 8 of power supply 2 by a resistor 12 which in the case of microprocessors 8048/8049 is integrated in the microprocessor. A capacitor 13 is connected in parallel between the emitter of transistor 11 and the ground line M of the device, ahd a diode 14 is mounted across the ends of resistor 6, the anode of diode 14 being connected to the common point between resistor 6 and capacitor 7, the cathode of diode 14 being connected to the ground line M of the device.

The operation of the device which has just been described is as follows. At the time of switching on, initialization of the microprocessor 3 is provided by capacitor 13 which is charged through the resistor 12 to the DC potential level VA supplied at terminal 8 of the power supply 2, capacitor 7 is also charged to the potential level VA through diode 14 then resistor 6. Under established operating conditions, when the potential VA supplied by the stabilized power supply keeps a substantially constant value, the $\overline{\text{RESET}}$ input of the microprocessor is brought to the potential level VA and the common point between capacitor 7 and resistor 6 is brought to the potential of the ground line M of the device. When, for any reason, the potential VA begins to decrease, the instantaneous variations of potential VA are transmitted by the capacitors 7 to the common point between resistor 6 and capacitor 7 so that the potential at this common point is brought to a level which is negative with respect to the ground line M, which causes a current to appear in the collector-emitter space of transistor 10, this current being amplified by transistor 11 which discharges capacitor 13 very rapidly in its collector-emitter space and places the $\overline{\text{RESET}}$ input of the microprocessor 3 at the potential of the ground line M. The fact that the $\overline{\text{RESET}}$ input is set to the ground potential causes the program counter of the microprocessor 3 to be reset and the internal circuits of the microprocessor to be reinitialized while interrupting the program which is being executed.

To obtain optimum operation of the device which has just been described, it is necessary to give to capacitors 7 and 13 and to transistor 11 characteristics such that a decrease of the voltage applied to the RESET terminal of the microprocessor 3 can be obtained which is much more rapid than the decrease of the potential VA supplied by the stabilized power source 2. If VB designates the potential which is applied by the emitter of transistor 11 of the $\overline{\text{RESET}}$ input of microprocessor 3, the condition which has been stated is written as $$\left| \frac{dVB}{dT} \right| >> \left| \frac{dVA}{dT} \right|. \tag{1}$$

If we let $C_3$ designate the capacitor or capacitor 13, $\beta$ the current gain of transistor 11 and $C_2$ the capacity of capacitor 7, the expression of the current I flowing through capacitor 13 may be stated in the form:

$$I = C_3 \frac{dVB}{dT} = \beta \times C_2 \frac{dVA}{dT}$$

which implies the relationship $$\frac{dVB}{dt} / \frac{dVA}{dt} = \frac{\beta \cdot C_2}{C_3}.$$

The relation (1) seems then proved if, between the values of $\beta$, $C_2$ and $C_3$, there exists the relationship $$\frac{\beta \cdot C_2}{C_3} >> 1.$$

In practice it is sufficient to choose for $C_2$ and $C_3$ values such that the relationship $$\frac{\beta \cdot C_2}{C_3} >> 10$$

is satisifed. For example, the preceding conditions may be verified by choosing for $C_3$ a value of 1 microfarad, for $\beta$ a value greater than or equal to 100 and for $C_2$ a value greater than or equal to 0.1 microfarad.

In the example which has just been described, resistor 6 ensures the charging of capacitor 7 between a voltage VA-0.6 volts and the nominal voltage VA of the power supply, the 0.6 volts corresponding to the threshold of the diode 14 if it is a silicon diode.

Thus, the admissible variation of the potential VA supplied by the power supply 2 without there being initialization of the microprocessor 3 is equal to the threshold of the base-emitter junction of transistor 10, namely 0.6 volts if the transistor 10 is a silicon transistor. If resistor 6 is left out, the admissible variation of the potential VA is theoretically equal to the sum of the threshold voltages of diode 14 and of the base-emitter junction of transistor 10 (1.2 volt if the diode 14 and transistor 10 are made from silicon) but in practice the combined leak resistances of diode 14, of the base-emitter junction of transistor 10 and of capacitor 7 will bring the admissible variation of VA down to a value between the threshold voltage of the base-emitter junction of transistor 10 and of diode 14. Since this value is limited but indeterminate, it is advisable, if it is desired to obtain an admissible variation of VA greater than the threshold voltage of the base-emitter junction of transistor 10, not to omit resistor 6 but to add, between the emitter of transistor 10 and the common point between capacitor 7 and resistor 6, one or more diodes in series (anode on the emitter side of transistor 10). The admissible variations of the potential of VA are then equal to the sum of the threshold voltages of the added diodes and of the base-emitter junction of transistor 10.

Figure 2:
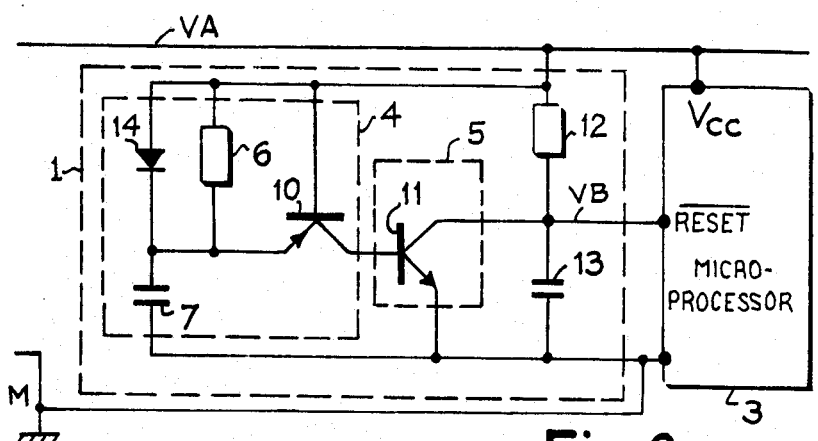
FIG. 2 is a variant of the device of the invention.

The invention is not limited to the embodiment which has just been described, it is obvious that other embodiments are also possible without for all that departing from the scope and spirit of the invention. In particular, a device in accordance with the invention equivalent to the one which has just been described may be obtained by means of transistors 10 and 11 complementary to those used for constructing the device shown in FIG. 1, the corresponding circuit being shown in FIG. 2. In this case, the collector of transistor 11 must be connected to the $\overline{\text{RESET}}$ input of microprocessor 3 and the order of connecting resistor 6 and capacitor 7 to terminals 8 and 9 of the power supply 2 must be permuted. In this case, also, the anode of diode 14 must be connected to terminal 8 of power supply 2, its cathode remaining connected to the common point between resistor 6 and capacitor 7 so as to allow charging of capacitor 7 through diode 14.

In yet another embodiment of the invention, an even more rapid response of the device may be obtained by replacing for example transistor 11 by two transistors coupled together so as to form an amplifier of the type known under the name DARLINGTON in order to obtain a very high current gain.

Figure 3:
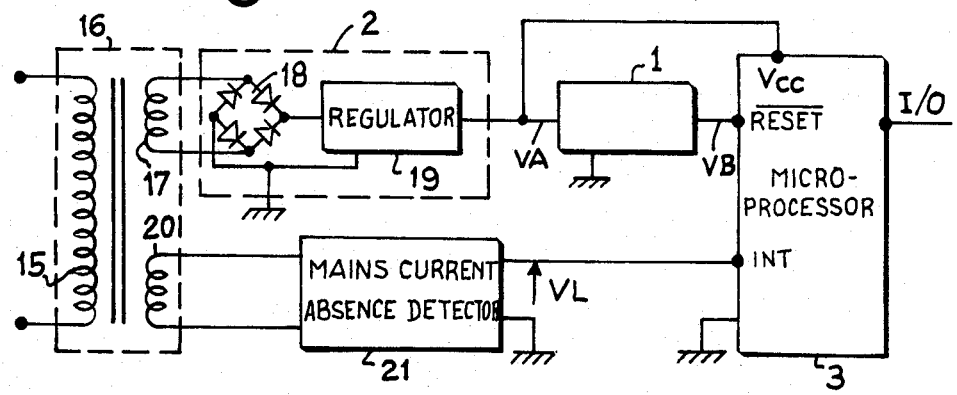
FIG. 3 is one application of the device of the invention to the construction of a device for safeguarding program instructions being executed in a microprocessor at the time of mains voltage cuts.

One use of the device of the invention for safeguarding programs being executed in a microprocessor when a mains cut appears will now be described with reference to the diagram shown in FIG. 3. In FIG. 3, the power supply 2 is connected to the mains through a primary winding 15 of a transformer 16 coupled to power supply 2 by a secondary winding 17. The power supply 2 comprises, in a way known per se, a rectifier bridge 18 fed by the secondary winding 17 and a regulator 19 fed by the outputs of the rectifier bridge 18. The transformer 16 has a second secondary winding 20 which feeds a mains current absence detector 21, the purpose of detector 21 being to apply a constant voltage VL to the interruption input INT of the microprocessor 3. As explained above, the output of device 1 of the invention is connected to the RESET input of microprocessor 3. When a mains voltage cut occurs, this cut is detected by the mains voltage absence detector 21, which applies in response a zero voltage level to the input INT of microprocessor 3 which interrupts the program being executed and starts up the safeguard sub program. Since the regulator 19 comprises in a way known per se, but not shown, a filtering cell placed upstream of the regulation, interruption of the mains voltage is not passed on instantaneously to the output of regulator 19. During a lapse of time determined by the energy storage capacity of regulator 19, voltage VA remains constant at the output of regulator 19 allowing device 1 to maintain the output voltage VB at a logic potential 1 at the RESET input of microprocessor 3 as long as the voltage VA is constant. The time delay between the interruption caused by the mains absence detector and resetting of the RESET is therefore as large as possible, since it is equal to the delay between the action of the mains absence detector and the beginning of a drop in the supply voltage VA of the microprocessor. Now, it is important that the delay between the interruption caused by the mains absence detector and resetting of the RESET is as large as possible since it is this delay which is used for executing a program for safeguarding the instruction being executed in the microprocessor 3, by executing an input-output instruction which dumps the contents of the registers of the microprocessor on the input-ouput bus IO towards an external storage means not shown.

What is claimed is:

1. A device for stopping the running of programs being executed in a microprocessor supplied by a DC power supply voltage, the microprocessor having an initialization RESET input and two supply terminals, a DC supply terminal and a ground supply terminal connected respectively to a ground supply terminal and to a DC supply terminal of the DC power supply, said device comprising:

a differentiator circuit coupled between a DC terminal and a ground terminal of the microprocessor, and a first capacitor connected in parallel between the RESET input and the ground supply terminal of the microprocessor, and connected in serial between the two supply terminals of the microprocessor through a first resistor for initializing the microprocessor at the time of switching on the power supply and a current amplifier controlled by the differentiator circuit, for discharging rapidly said capacitor when the supply voltage begins to decrease.

2. The device as claimed in claim 1, comprising: in said differentiator circuit a second resistor and a second capacitor connected in series between the two power supply terminals of the microprocessor, the ends common to said capacitor and to said resistor being connected to the current amplifier.

3. The device as claimed in claim 2, wherein the value of the second capacitor in said differentiator circuit and the value of the first capacitor connected between the RESET input and ground supply terminal, are related by the relationship $$\frac{\beta \cdot C_2}{C_3} >> 10$$

where $\beta$ represents the current gain of the current amplifier, $C_2$ designates the capacity of the second capacitor and $C_3$ designates the capacity of the first capacitor.

4. The device as claimed in claim 3, wherein the current amplifier comprises two transistors coupled together in a DARLINGTON circuit.

5. Use of the device as claimed in claim 1 for safeguarding program instructions being executed in a microprocessor when DC power supply is supplied from the mains and when a mains voltage cuts occurs consisting of, generating an interruption signal on an interruption input INT of the microprocessor when a mains voltage cut occurs, said interruption signal being generated by a mains current absence detector connected to the mains.

* * * * *